3,217,040
PROCESS FOR THE PREPARATION OF ALKYLATED AROMATIC AMINES

Louis Schmerling, Riverside, Ill., assignor to Universal Oil Products Company, Des Plaines, Ill., a corporation of Delaware
No Drawing. Filed Nov. 23, 1962, Ser. No. 239,769
16 Claims. (Cl. 260—577)

This application relates to a process for the production of alkyl aromatic amines. More specifically, the invention is concerned with a process for the preparation of N-alkyl and N,N-dialkyl aromatic amines.

It has now been discovered that aromatic amines and particularly N-alkylated or N,N-dialkylated aromatic amines may be prepared by condensing an aromatic amine with an alkylating agent comprising an alkylamine in the presence of a catalyst comprising iodine. The products thus prepared according to the process of this invention will find a wide variety of use in the chemical field particularly as intermediates in the preparation of dyes, pharmaceuticals, light-sensitive diazonium salts which are used for diazo-type printing papers and inhibitors which will retard the oxidative deterioration of various organic materials such as motor fuel, particularly unsaturated gasolines as, for example, cracked gasoline and polymer gasolines, diesel oil, mineral oil, lubricating oil, fuel oil, drying oil, greases, rubber monomers such as styrene, butadiene, etc., paraffin waxes, edible fats and oils, etc.

Among the edible fats and oils which may be of animal, vegetable or mineral origin and which tend to become rancid especially during long periods of storage prior to use are linseed oil, menhadin oil, cod liver oil, caster oil, olive oil, rapeseed oil, coconut oil, palm oil, corn oil, sesame oil, peanut oil, babassu oil, butter, fat, lard, beef tallow, etc. as well as the hydrogenated oils. These materials are adversely affected by oxygen with the resultant formation of undesirable gums, discoloration, rancidity or other deleterious reactions. Therefore, certain substances must be added to the aforementioned organic materials which act to stabilize such materials and thus delay or prevent the undesired reactions from occurring. These additives will fall within the broad term "inhibitors" which may be prepared from the intermediates formed according to the process of this invention.

It is therefore an object of this invention to provide a process for the preparation of alkylated aromatic amines.

Another object of this invention is to provide a process for preparing N-alkyl and N,N-dialkyl aromatic amines which are useful, as hereinbefore set forth, as intermediates in the preparation of other organic compounds.

Taken in its broadest aspect one embodiment of this invention resides in a process for the preparation of an N-alkyl aromatic amine which comprises alkylating an aromatic amine with an alkylamine in the presence of iodine at alkylating conditions and recovering the desired N-alkyl aromatic amine.

A further embodiment of this invention is found in a process for the preparation of an N-alkyl aromatic amine which comprises alkylating aniline with an alkylamine in the presence of iodine at a temperature in the range of from about 100° to about 350° C. and at a pressure in the range of from about atmospheric to about 100 atmospheres and recovering the desired N-alkyl aniline.

Yet another embodiment of this invention is found in a process for the preparation of an N-alkyl aromatic amine which comprises alkylating an aromatic amine with diisopropylamine in the presence of iodine at a temperature in the range of from about 100° to about 350 C. and at a pressure in the range of from about atmospheric to about 100 atmospheres and recovering the desired N-alkyl aromatic amine.

A specific embodiment of this invention resides in a process for the preparation of an N-alkyl aromatic amine which comprises alkylating aniline with diethylamine in the presence of iodine at a temperature in the range of from about 200° to about 350° C. and at a pressure in the range of from about atmospheric to about 50 atmospheres and recovering the desired N-ethylaniline and N,N-diethylaniline.

Other objects and embodiments will be found in the following further detailed description of this invention.

As hereinbefore set forth, it has now been discovered that N-alkyl aromatic amines may be prepared by condensing an alkylatable aromatic amine with an alkylamine in the presence of a catalyst comprising iodine. The alkylatable aromatic amines which may be utilized in the process of this invention are those containing at least one replaceable hydrogen on the nitrogen atom and consisting of carbon, hydrogen and nitrogen and include aniline, o-toluidine, m-toluidine, p-toluidine, 2,4-dimethylaniline, 2,5-dimethylaniline, 2,6-dimethylaniline, 2,4,6-trimethylaniline, o-ethylaniline, m-ethylaniline, p-ethylaniline, 2,4-diethylaniline, 2,5-diethylaniline, 2,6-diethylaniline, 2,4,6-triethylaniline, 1-naphthylamine, 2-naphthylamine, 1-methyl-2-naphthylamine, 3-methyl-2-naphthylamine, 2-methyl-1-naphthylamine, 3-methyl-1-naphthylamine, 1 - ethyl - 2 - naphthylamine, 2 - ethyl - 1 - naphthylamine, o - phenylenediamine, m - phenylenediamine, p - phenylenediamine, 4 - methyl - o - phenylenediamine, 4 - methyl - m - phenylenediamine, 4 - ethyl- o - phenylenediamine, 4 - ethyl - m - phenylenediamine, 2 - methyl - m - phenylenediamine, 2 - methyl - p - phenylenediamine, 2 - ethyl - m - phenylenediamine, 2 - ethyl- p - phenylenediamine, 1,2,3 - triaminobenzene, 1,2,4 - triaminobenzene, 1,3,5 - triaminobenzene, etc.

Suitable alkyl amines which may be used as the alkylating agents in the process of this invention include primary, secondary and tertiary amines, the alkyl groups of said alkylamines containing from 1 up to about 20 carbon atoms or more per group and preferably from about 2 to about 12 carbon atoms per group. In addition the alkyl groups of the alkylamine may be primary, secondary or tertiary alkyl radicals. Examples of alkylamines falling within the above enumerated class include methylamine, dimethylamine, trimethylamine, ethylamine, diethylamine, triethylamine, propylamine, dipropylamine, tripropylamine, isopropylamine, diisopropylamine, triisopropylamine, n-butylamine, di-n-butylamine, tri-n-butylamine, sec-butylamine, di-sec-butylamine, tri-sec-butylamine, other butylamines, the isomeric mono-, di- and tripentyl, hexyl, heptyl, octyl, nonyl, decyl, undecyl, dodecyl, tridecyl, tetradecyl, pentadecyl, hexadecyl, heptadecyl, octadecyl, nonadecyl, eicosyldecyl amines, etc.

As hereinbefore set forth the condensation between the aromatic amine and the alkylating agent comprising an alkylamine of the type hereinbefore set forth is effected in the presence of a catalyst comprising iodine at alkylation conditions. Such alkylation conditions include a temperature within the range of from about 100° to about 350° C. and preferably in a range of from about 150° to about 250° C. In addition, the reaction is effected at pressures within the range of from about atmospheric to about 100 atmospheres or more, the preferred pressure being that which is sufficient to maintain at least a portion of the reactants in the liquid phase. Such pressure may, if so desired, be formed by the introduction of a substantially inert gas such as nitrogen into the reaction zone.

The process of this invention may be effected in any suitable manner and may comprise either a batch or continuous type operation. For example, when a batch type operation is used, a quantity of the aromatic amine, the alkylamine and the catalyst is placed in an appropriate apparatus provided with heating means. A particularly applicable apparatus in which to effect the batch type operation of the present process comprises a rotating or a stirring autoclave. When such an apparatus is used, the aforementioned materials are placed in the glass liner thereof following which the autoclave is sealed and heated to the desired reaction temperature. As also hereinbefore set forth, if superatmospheric pressures are desired, an inert gas such as nitrogen is pressed in to effect said pressure. Upon completion of the desired residence time the autoclave and contents thereof are cooled to room temperature. The excess pressure, if any, is vented and the autoclave is opened. The reaction product is then washed with water and an alkaline substance to remove the catalyst, separated from the water layer, dried and subjected to fractional distillation under reduced pressure whereby the desired product comprising the N-alkyl and N,N-dialkyl aromatic amine is separated and recovered.

It is also contemplated within the scope of this invention that the process described herein may be effected in a continuous manner of operation although not necessarily with equivalent results. When such a method is used, a solution of the iodine in the aromatic amine and the alkalating agent is continuously charged to a reaction zone, said reaction zone being maintained at the proper operating conditions of temperature and pressure. The alkylating agent and the aromatic amine may be charged from the same or separate lines and if separate lines are used, the iodine may be dissolved in either reactant. Upon completion of the desired residence time the reactor effluent is continuously withdrawn, the desired reaction product comprising the N-alkyl and N,N-dialkyl aromatic amine is separated from unreacted starting materials and recovered by means similar to those hereinbefore set forth.

Examples of N-alkyl and N,N-dialkyl aromatic amines which may be prepared according to the process of this invention include N-methylaniline, N,N-dimethylaniline, N-ethylaniline, N,N-diethylaniline, N-propylaniline, N,N-dipropylaniline, N-isopropylaniline, N,N-diisopropylaniline, N - isobutyl - aniline, N,N - diisobutylaniline, N - sec - butylaniline, N,N - di - sec - butylaniline, N - t - butylaniline, N - ethyl-o-toluidine, N,N-diethyl-o-toluidine, N-propyl-o-toluidines, N,N-dipropyl-o-toluidines, N - butyl-o-toluidines, N,N-dibutyl-o-toluidines, N-ethyl-m-toluidine, N,N-diethyl-m-toluidine, N-propyl-m-toluidines, N,N-dipropyl-m-toluidines, N-butyl-m-toluidines, N,N-dibutyl-m-toluidines, N-ethyl-p-toluidine, N,N-diethyl-p-toluidine, N-propyl-p-toluidines, N,N-dipropyl-p-toluidines, N-butyl-p-toluidines, N,N-ditbutyl-p-toluidines, N-ethyl-o-ethylaniline, N,N - diethyl-o-ethylaniline, N-isopropyl-o-ethylaniline, N,N-diisopropyl-o-ethylaniline, N - isobutyl-o-ethylaniline, N,N-diisobutyl-o-ethylaniline, N-ethylnaphthylamines, N,N-diethylnaphthylamines, N-isopropylnaphthylamines, N,N - diisopropylnaphthylamines, N-butylnaphthylamines, N,N-diisobutylnaphthylamines, N-octylanilines, N,N-dioctylanilines, N-dodecylanilines, N,N-didodecylanilines, N-octyl-p-toluidines, N, N-dioctyl-p-toluidines, N-dodecyl-p-toluidines, N,N-didodecyl-p-toluidines, N-octylnaphthylamines, N,N-dioctylnaphthylamines, N-dodecylnaphthylamines, N,N-didodecylnaphthylamines, etc. It is to be understood that the aforementioned reactions products are only representatives of the type of compounds and that the present process is not necessarily limited thereto.

When utilizing a monoalkylamine as an alkylating agent, an excess of said alkylamine over the aromatic amine will be required in order to obtain an N,N-dialkyl aromatic amine. Therefore, it is contemplated within the scope of this invention that the alkylamine may be present in an amount within the range of from about 0.2:1 to about 5:1 moles of alkylamine per mole of aromatic amine.

The following examples are given to illustrate the process of the present invention which, however, are not intended to limit the generally broad scope of the present invention in strict accordance therewith.

Example I

In this experiment a mixture of 107 grams (1.15 moles) of aniline and 52 grams (0.71 mole) of diethylamine along with 1 gram of iodine was placed in the glass liner of a rotating autoclave which was then heated to a temperature of about 200° C. The autoclave was maintained at a temperature ranging from 200° to 300° C. for a period of about 5.5 hours. At the end of this time the autoclave and contents thereof were allowed to cool to room temperature. The reaction product was recovered, washed with water in sodium hydroxide solution to remove the catalyst. The desired reaction product was extracted with ether, dried and subjected to fractional distillation under reduced pressure. There was recovered 36 grams of N-ethylaniline and 3 grams of N,N-diethylaniline.

Example II

In order to illustrate the necessity for the iodine catalyst the above experiment was repeated eliminating iodine in the reaction mixture, that is, 107 grams of aniline and 52 grams of diethylamine were heated at a temperature in the range of 200° to 300° C. in a glass liner in a rotating autoclave. The reaction product at the end of the residence time of 5.5 hours, was washed with water, separated from the water layer by ether extraction, dried and subjected to fractional distillation. The distillation disclosed the fact that little or no reaction had occurred.

Example III

A mixture of 107 grams (1.0 mole) of p-toluidine and a molar excess comprising 150 grams (2.0 moles) of diethylamine is placed in the glass liner of a rotating autoclave along with 1 gram of iodine. The autoclave is sealed and heated to a temperature in the range of from about 200° to about 300° C. for a period of 6 hours. At the end of this time the autoclave is cooled to room temperature, opened and the reaction product is washed with water and sodium hydroxide solution. The organic layer is extracted with ether, dried and subjected to fractional distillation. The desired reaction product comprising N-ethyl-p-toluidine and N,N-diethyl-p-toluidine is separated and recovered.

Example IV

In this example 100 grams (0.7 mole) of 1-naphthylamine and 260 grams (2.0 moles) of diisopropylamine along with a catalyst comprising 2 grams of iodine is treated in a manner similar to that set forth in the above examples. At the end of the residence time the autoclave and contents thereof are cooled to room temperature, the autoclave is opened and the reaction product is recovered. The reaction product is then treated with water and sodium hydroxide solution, extracted with ether to separate the organic layer which is thereafter dried and subjected to fractional distillation under reduced pressure. The desired reaction product comprising N-isopropyl-1-naphthylamine and N,N-diisopropyl-1-naphthylamine is separated and recovered.

Example V

In this experiment 47 grams (0.5 mole) of aniline and 353 grams (1.0 mole) of dodecylamine along with 1 gram of iodine is placed in a rotating autoclave which is then heated to a temperature in the range of from about 200° to 300° C. for a period of 6 hours. At the end of this time the autoclave and contents thereof are cooled to room temperature, the reaction product is washed with water and an alkali to remove the catalyst. The mixture is then extracted with ether, the water layer removed and the ether layer dried and subjected to fractional distillation under reduced pressure. The desired product comprising N-dodecylaniline and N,N-didodecylaniline is separated and recovered.

*Example VI*

In this example 121 grams (1.0 mole) of p-ethylaniline along with 135 grams (3.0 moles) of ethylamine is treated with 1 gram of iodine in a manner similar to that set forth in the above examples. At the end of the desired residence time the reaction mixture is recovered, washed with water and alkali and extracted with ether. The ether extract is dried and subjected to fractional distillation under reduced pressure. The desired product comprising N-ethyl-p-ethylaniline and N,N-diethyl-p-ethylaniline is separated and recovered.

I claim as my invention:

1. A process for the preparation of an N-alkyl aromatic amine which comprises alkylating aromatic amine containing at least one replaceable hydrogen on the nitrogen atom and consisting of carbon, hydrogen and nitrogen with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl aromatic amine and N,N-di-alkyl-aromatic amine.

2. A process for the preparation of an N-alkyl aromatic amine which comprises alkylating aniline with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkylaniline and N,N-dialkylaniline.

3. A process for the preparation of an N-alkyl aromatic amine which comprises alkylating p-toluidine with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl-p-toluidine and N,N-dialkyl-p-toluidine.

4. A process for the preparation of an N-alkyl aromatic amine which comprises alkylating 1-naphthylamine with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl-1-naphthylamine and N,N-dialkyl-1-naphthylamine.

5. A process for the preparation of an N-alkyl aromatic amine which comprises alkylating p-ethylaniline with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl-p-ethylaniline and N,N-dialkyl-p-ethylaniline.

6. A process for the preparation of an N-alkyl aromatic amine which comprises alkylating 2,6-dimethylaniline with alkylamine containing from 1 to about 20 carbon atoms per alkyl group in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl-2,6-dimethylaniline and N,N-dialkyl-2,6-dimethylaniline.

7. A process for the preparation of an N-alkyl aromatic amine which comprises alkylating aromatic amine containing at least one replaceable hydrogen on the nitrogen atom and consisting of carbon, hydrogen and nitrogen with ethylamine containing from 1 to 3 ethyl groups in the presence of iodine at a temperature in the range of from about 100° to about 350° C. and at a pressure in the range of from about atmospheric to about 100 atmospheres, the amount of the second-mentioned reactant being within the range of from about 0.2:1 to about 5:1 moles per mole of the first-mentioned reactant, and recovering the resultant N-alkyl aromatic amine and N,N-di-alkyl-aromatic amine.

8. A process for the preparation of an N-alkyl aromatic amine which comprises alkylating aromatic amine containing at least one replaceable hydrogen on the nitrogen atom and consisting of carbon, hydrogen and nitrogen with diethylamine in the presence of iodine at a temperature in the range of from about 100° to about 350° C. and at a pressure in the range of from about atmospheric to about 100 atmospheres and recovering the resultant N-alkyl aromatic amine and N,N-di-alkyl-aromatic amine.

9. A process for the preparation of an N-alkyl aromatic amine which comprises alkylating aromatic amine containing at least one replaceable hydrogen on the nitrogen atom and consisting of carbon, hydrogen and nitrogen with diisopropylamine in the presence of iodine at a temperature in the range of from about 100° to about 350° C. and at a pressure in the range of from about atmospheric to about 100 atmospheres and recovering the resultant N-alkyl aromatic amine and N,N-di-alkyl-aromatic amine.

10. A process for the preparation of an N-alkyl aromatic amine which comprises alkylating aromatic amine containing at least one replaceable hydrogen on the nitrogen atom and consisting of carbon, hydrogen and nitrogen with tributylamine in the presence of iodine at a temperature in the range of from about 100° to about 350° C. and at a pressure in the range of from about atmospheric to about 100 atmospheres and recovering the resultant N-alkyl aromatic amine and N,N-di-alkyl-aromatic amine.

11. A process for the preparation of an N-alkyl aromatic amine which comprises alkylating aromatic amine containing at least one replaceable hydrogen on the nitrogen atom and consisting of carbon, hydrogen and nitrogen with didodecylamine in the presence of iodine at a temperature in the range of from about 100° to about 350° C. and at a pressure in the range of from about atmospheric to about 100 atmospheres and recovering the resultant N-alkyl aromatic amine and N,N-di-alkyl-aromatic amine.

12. A process for the preparation of an N-alkyl aromatic amine which comprises alkylating aniline with diethylamine in the presence of iodine at a temperature in the range of from about 200° to about 350° C. and at a pressure in the range of from about atmospheric to about 50 atmospheres and recovering the resultant N-ethylaniline and N,N-diethylaniline.

13. A process for the preparation of an N-alkyl aromatic amine which comprises alkylating p-toluidine with diethylamine in the presence of iodine at a temperature in the range of from about 200° to about 350° C. and at a pressure in the range of from about atmospheric to about 50 atmospheres and recovering the resultant N-ethyl-p-toluidine and N,N-di-ethyl-p-toluidine.

14. A process for the preparation of an N-alkyl aromatic amine which comprises alkylating 1-naphthylamine with diisopropylamine in the presence of iodine at a temperature in the range of from about 200° to about 350° C. and at a pressure in the range of from about atmospheric to about 50 atmospheres and recovering the resultant N-isopropyl-1-naphthylamine and N,N-diisopropyl-1-naphthylamine.

15. A process for the preparation of an N-alkyl aromatic amine which comprises alkylating aniline with di-dodecylamine in the presence of iodine at a temperature in the range of from about 200° to about 350° C. and at a pressure in the range of from about atmospheric to about 50 atmospheres and recovering the resultant N-dodecylaniline and N,N-didodecylaniline.

16. A process for the preparation of an N-alkyl aromatic amine which comprises alkylating p-ethylaniline with ethylamine in the presence of iodine at a temperature in the range of from about 200° to about 350° C. and at a pressure in the range of from about atmospheric to about 50 atmospheres, the amount of the second-mentioned reactant being within the range of from about 0.2:1 to about 5:1 moles per mole of the first-mentioned reactant, and recovering the resultant N-ethyl-p-ethylaniline and N,N-diethyl-p-ethylaniline.

References Cited by the Examiner

FOREIGN PATENTS 250,236    4/25    Germany.

OTHER REFERENCES

Horning: Organic Syntheses, Collective volume III, 1955, pp. 256–258.

Sheehan: Organic Syntheses, volume 38, 1958, pp. 5–7,

CHARLES B. PARKER, *Primary Examiner.*